US011089865B2

(12) United States Patent
Knapp et al.

(10) Patent No.: US 11,089,865 B2
(45) Date of Patent: Aug. 17, 2021

(54) SYNCHRONIZED MONITOR MOUNT AND DESK HEIGHT ADJUSTMENT SYSTEM

(71) Applicant: CKnapp Sales, Inc., Goodfield, IL (US)

(72) Inventors: Chance Knapp, Goodfield, IL (US); Brandon Meyer, Normal, IL (US); Micah Fehr, Danvers, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 142 days.

(21) Appl. No.: 16/209,046

(22) Filed: Dec. 4, 2018

(65) Prior Publication Data
US 2020/0170407 A1 Jun. 4, 2020

(51) Int. Cl.
*F16M 13/00* (2006.01)
*A47B 21/02* (2006.01)
*A47B 9/20* (2006.01)
*A47B 21/04* (2006.01)
*F16M 13/02* (2006.01)

(52) U.S. Cl.
CPC ............... *A47B 21/02* (2013.01); *A47B 9/20* (2013.01); *A47B 21/04* (2013.01); *F16M 13/022* (2013.01); *A47B 2200/004* (2013.01); *A47B 2200/0066* (2013.01)

(58) Field of Classification Search
CPC .................................. A47B 21/02; A47B 9/00
USPC ......... 248/917, 920; 108/50.01, 50.02, 50.11
See application file for complete search history.

(56) References Cited

U.S. PATENT DOCUMENTS

| 8,051,782 | B2 | 11/2011 | Nethken et al. |
| 2009/0133609 | A1 | 5/2009 | Nethken et al. |
| 2012/0085267 | A1 | 4/2012 | Kenny |
| 2013/0255544 | A1 | 10/2013 | Scharing |
| 2014/0096706 | A1* | 4/2014 | Labrosse .............. G05B 19/048 108/21 |
| 2014/0245932 | A1 | 9/2014 | McKenzie, III et al. |
| 2018/0132608 | A1* | 5/2018 | Benden .................. A47B 97/00 |
| 2019/0053617 | A1* | 2/2019 | Laudadio ........... F16M 11/2014 |
| 2019/0328128 | A1* | 10/2019 | Namala .................... A47B 9/16 |

(Continued)

FOREIGN PATENT DOCUMENTS

CN 106937794 A 7/2017
KR 20170130751 A 11/2017

(Continued)

OTHER PUBLICATIONS

Examiner's Report for CA Application No. 3,028,426 dated Jan. 16, 2020.

(Continued)

*Primary Examiner* — Steven M Marsh
(74) *Attorney, Agent, or Firm* — Marshall, Gerstein & Borun LLP

(57) ABSTRACT

A monitor mount includes an adjustable frame assembly and a height adjustment system, which has a drive assembly, a controller, and a sensor. The drive assembly is operatively connected to the frame assembly to control a viewing height of the monitor mount and the controller is communicatively coupled to the drive assembly to control the drive assembly. The sensor is in communication with the controller, which controls the drive assembly to adjust the viewing height of the monitor mount based on a signal received from the sensor.

26 Claims, 10 Drawing Sheets

(56) References Cited

U.S. PATENT DOCUMENTS

2019/0328129 A1* 10/2019 Namala .................... A47B 9/16
2019/0343272 A1* 11/2019 Smith .................... F16M 11/24
2020/0015588 A1* 1/2020 Patrick ................ F16M 11/041

FOREIGN PATENT DOCUMENTS

WO    WO-2017200488 A1    11/2017
WO    WO-2018223240    12/2018

OTHER PUBLICATIONS

Partial European Search Report for EP Application No. EP19164738 dated Dec. 4, 2019.
European Search Report for EP Application No. 19164732 dated Oct. 8, 2019.
Office Action for CA Application No. 3,028,409 dated Apr. 24, 2020.
Examiner's Report for CA Application No. 3,028,426 dated Jul. 7, 2020.

\* cited by examiner

SYNCHRONIZED MONITOR MOUNT AND DESK HEIGHT ADJUSTMENT SYSTEM

FIELD OF THE INVENTION

This disclosure relates generally to adjustable height desks and monitor mounts and, more particularly, to height adjustment systems for adjustable height desks and adjustable height monitor mounts.

BACKGROUND

Standard height adjustable desks currently have height adjustment systems that allow a user the change the height of the desk (e.g., from a sitting height to a standing height). These height adjustment systems could be manual, such as a lever that releases a mechanism and allows the desk to be pushed to a desired position or a crank that moves the desk to various heights, or could be electronic, such as an input interface having inputs to allow the user to move the desk up or down or move the desk to saved heights. Similarly, standard adjustable monitor mounts also have height adjustment system that allow a user the change the height or viewing height of the monitor mount. However, when a current height adjustable desk is used with a current adjustable monitor mount, every time the height of the desk is adjusted, the user must then also manually adjust the height or viewing height of the adjustable monitor mount to adjust the viewing height of the monitors for the specific desk height.

SUMMARY

In accordance with one exemplary aspect of the present invention, a monitor mount comprises an adjustable frame assembly and a height adjustment system including a drive assembly, a controller, and a sensor. The drive assembly is operatively connected to the frame assembly to control a viewing height of the monitor mount and the controller is communicatively coupled to the drive assembly to control the drive assembly. The sensor is in communication with the controller, which controls the drive assembly to adjust the viewing height of the monitor mount based on a signal received from the sensor.

In further accordance with any one or more of the foregoing exemplary aspects of the present invention, a monitor mount may further include, in any combination, any one or more of the following preferred forms.

In one preferred form, the controller is in communication with the sensor through one of a wired connection or a wireless connection.

In another preferred form, the monitor mount comprises a base and the drive assembly is disposed within the base.

In another preferred form, the base comprises a clamp or a grommet mount adapted to secure the monitor mount to a desk.

In another preferred form, the drive assembly comprises at least one of an electric motor, an electronically controlled hydraulic cylinder, or an electronically controlled gas spring.

In another preferred form, the frame assembly includes a telescoping arm.

In another preferred form, the drive assembly adjusts a length of the telescoping arm.

In another preferred form, the frame assembly comprises a cross arm secured to the telescoping arm and a display mounting interface secured to an end of the cross arm.

In another preferred form, the sensor is a motion sensor.

In another preferred form, the sensor is at least one of a gyroscope, an accelerometer, a proximity sensor, an optical sensor, an infrared sensor, a vibration sensor, or a light sensor.

In another preferred form, the sensor is a position sensor.

In another preferred form, the position sensor is at least one of an encoder, an accelerometer, a proximity sensor, an optical sensor, or an infrared sensor.

In accordance with another exemplary aspect of the present invention, a height adjustment system comprises a sensor, a transceiver, and a controller communicatively coupled to the sensor and the transceiver. The controller is configured to detect a first movement with the sensor and transmit, via the transceiver, at least one of: (1) a first communication to an adjustable monitor mount, the first communication generated based on the first movement, or (2) a second communication to a height adjustable desk, the second communication generated based on the first movement, such that a viewing height of the adjustable monitor mount is synchronized with a height of the height adjustable desk to accommodate a sitting position of a user or a standing position of a user.

In further accordance with any one or more of the foregoing exemplary aspects of the present invention, a height adjustment system may further include, in any combination, any one or more of the following preferred forms.

In one preferred form, the sensor is a motion sensor.

In another preferred form, the sensor is at least one of a gyroscope, an accelerometer, a proximity sensor, an optical sensor, an infrared sensor, a vibration sensor, or a light sensor.

In another preferred form, the sensor is a position sensor.

In another preferred form, the position sensor is at least one of an encoder, an accelerometer, a proximity sensor, an optical sensor, or an infrared sensor.

In another preferred form, the height adjustment system comprising a housing and at least one of the sensor, the transceiver, or the controller is disposed at least partially within the housing. The housing is mounted to either: (1) a first surface associated with the adjustable monitor mount; or (2) a second surface associated with the height adjustable desk.

In another preferred form, the first communication or the second communication is a wired communication.

In another preferred form, the first communication or the second communication is a wireless communication.

In another preferred form, the first movement is associated with a movement of the height adjustable desk, the movement of the height adjustable desk causing transmission of the first communication to the adjustable monitor mount.

In another preferred form, the controller is a frame controller of the height adjustable desk and a monitor controller of the adjustable monitor mount receives the first communication, the monitor controller adjusting the adjustable monitor mount to accommodate the sitting position or the standing position.

In another preferred form, the second movement is associated with a movement of the adjustable monitor mount, the movement of the adjustable monitor mount causing transmission of the second communication to the height adjustable desk.

In another preferred form, the controller is a monitor controller of the adjustable monitor mount and a frame controller of the height adjustable desk receives the second communication, the frame controller adjusting the height adjustable desk to accommodate the sitting position or the standing position.

In another preferred form, the viewing height of the adjustable monitor mount is adjusted such that a center of a monitor attached to the adjustable monitor mount is at or near an eye level of a user.

In another preferred form, the height of the height adjustable desk is adjusted such that a top of a surface of a desktop of the height adjustable desk is at or near an elbow level of a user.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and devices disclosed therein. It should be understood that each Figure depicts an embodiment of a particular aspect of the disclosed systems and devices, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

FIGS. 1-4 illustrate an example ergonomically adjustable workstation 10, which includes a height adjustable desk 100, adjustable monitor mount 200, and a height adjustment system 300. Desk 100 and monitor mount 200 are individually motorized and are able to be adjusted individually or to synchronize electronically for simultaneous operation through height adjustment system 300, as described in more detail below.

Figure 6:
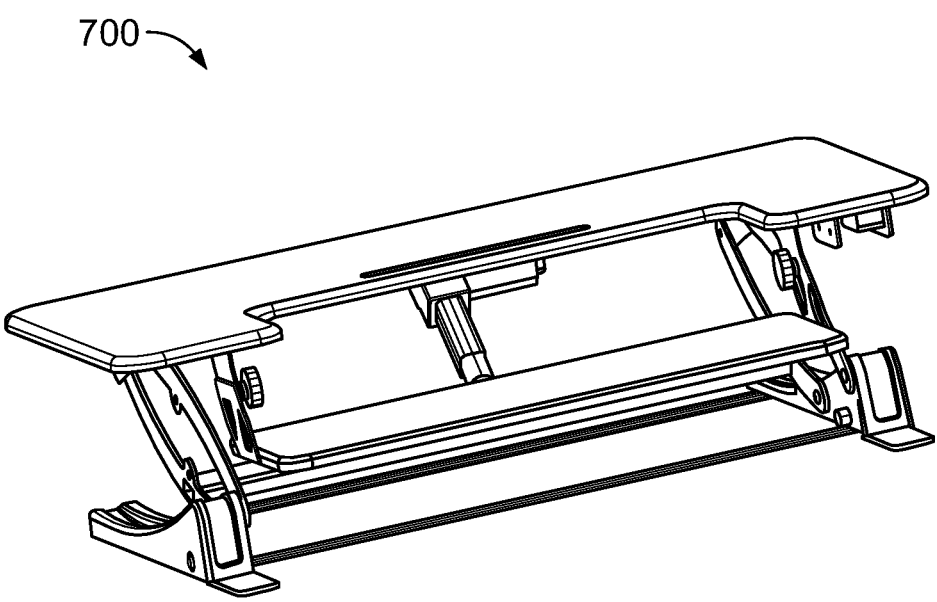
FIG. 6 is a perspective view of a sit stand converter workstation desk frame.

Desk 100 includes a desktop 110 and an adjustable desk frame 120 secured to desktop 110 with screws, bolts, or any other well-known fastening means. In the example shown, desk frame 120 is a freestanding desk frame, such as the VIVO DESK-V103EW, but could also be a sit stand converter workstation desk frame 700 (see FIG. 6), such as the VIVO DESK-V000VE, which rests on another desktop to provide an adjustable height workstation on top of a standard desk. Desk frame 120 includes a base frame 125 that supports desktop 110 and has an adjustable cross beam 130 and two support beams 135 that extend transverse to cross beam 130 and are connected to cross beam 130 at opposite ends of cross beam 130. Cross beam 130 can be a telescoping beam so that the length L of desk frame 120 can be adjusted to fit various length desktops. A pair of telescoping legs 140 are attached to and extend transversely from base frame 125. Each leg 140 has multiple telescoping sections 140A, 140B, 140C such that legs 140 extend and retract so that the length of legs 140 can be changed to adjust the height H of desk 100. While two telescoping legs 140 are illustrated in the example shown, any number of legs could be used. For example, the desk frame could have a single leg that extends from the center of cross beam 130 or could have four legs that extend from each end of the support beams. A base beam 145 can also be attached to the end of each leg 140 to provide support and stability to desk frame 120. Base beams 145 can extend transverse to legs 140 and can have leveling feet 150 near the ends of base beams 145 to assist in leveling desk frame 120.

In the example shown, monitor mount 200 includes a base 205 that can rest on an upper surface of desktop 110 of desk 100 or can be secured to desk 100, base frame 125, or other portion (e.g., cross beam 130) of desk 100. For example, in an alternate embodiment, the base can be in the form of a clamp, such as a c-clamp, or a grommet mount that extends around or through desktop 110 and is tightened to engage opposite top and bottom surfaces of desktop 110 to secure monitor mount 200 to desk 100. An adjustable frame assembly 240 has a telescoping arm 215 that extends from base 205 and a cross arm 220 that is secured to telescoping arm 215 near an end of telescoping arm 215, opposite base 205. Telescoping arm 215 has multiple telescoping sections 215A, 215B such that telescoping arm 215 extends and retracts so that the length of telescoping arm 215 can be changed to adjust the viewing height of any monitors mounted on monitor mount 200. As used herein, the viewing height is the height of monitor mount 200 when a center of one or more monitor mounted on monitor mount is approximately level with the eyes of a user. Cross arm 220 can be secured to telescoping arm 215 in an manner desired, but is preferably adjustable so that the vertical and angular position of cross arm 220 on telescoping arm 215 can be adjusted, as desired. As shown, cross arm 220 has multiple sections 220A, 220B, 220C, 220D that are interconnected by movable joints 225, such as hinges, so that the shape of cross arm 220 can be adjusted to position monitors mounted on monitor mount 200 in various positions. Alternatively, cross arm 220 can be a solid beam or bar that extends transverse to telescoping arm 215. Display mounting interfaces 230 are secured to opposite ends of cross arm 220 so that multiple monitors can be mounted on monitor mount 200. Preferably, display mounting interfaces 230 are VESA mounts and are secured to cross arm 220 by movable joints 235, such as hinges, so that the angular position of the monitors can be adjusted by a user. Although monitor mount 220 has been described as being adapted to mount two monitors, monitor mount 200 can be configured to mount any number of monitors desired. For example, a single display mounting interface can be secured directly (or, alternatively, indirectly) to the telescoping arm for mounting a single monitor, three or more display mounting interfaces can be secured to the cross arm or mounting multiple monitors, or additional cross arms could be secured to the telescoping arm, each having multiple display mounting interfaces, for mounting a larger number of monitors.

Although monitor mount 200 has been described herein as being a monitor mount on which display or monitors are mounted directly, the monitor mount could also be an adjustable platform on which a standard display or monitor can be placed or any other type of adjustable monitor stand. In the case of an adjustable platform, the platform would be secured to the end of one or more telescoping arms, opposite the base, so that the height of the platform, and any display (s) or monitor(s) on the platform, could be adjusted.

To adjust the height of desk 100 and monitor mount 200, workstation 10 has a height adjustment system 300, which generally includes a first controller 305, a drive assembly 310 for desk frame 120, a second controller 325, and a drive assembly 330 for monitor mount 200.

Controller 305 is in communication with drive assembly 310 through a wired (as shown) or wireless (e.g., BLUETOOTH®, WIFI, cellular, etc.) connection and is configured to control drive assembly 310 to control the height of desk 100. Controller 305 can have an input interface, such as a touch screen, buttons, etc., that allows a user to adjust the height of desk 100 up or down, save preset heights for desk 100, etc. Based on the input received from the user, controller 305 sends a signal or command (e.g., an electronic signal or command, which may be a packet-based or non-packet-based electrical signal or communication) to drive assembly 310 to move desk frame 120 upwards, downwards, or to a predetermined position. Drive assembly 310 is mounted in desk frame 120 and, in the example shown, includes a control unit 315, in communication with controller 305, and a pair of electric motors 320 in communication with control unit 315 and coupled to telescoping legs 140 of desk frame 120 to control the height of desk frame 120. Based on the signals or commands received from controller 305, control unit 315 activates or deactivates electric motors 320 to extend or retract telescoping legs 140 and control the length of telescoping legs 140 to adjust the height of desk 100 to the desired height. Although the example drive assembly 310 shown and described herein includes a pair of electric motors 320 and a separate control unit 315, drive assembly 310 could use any number of electric motors appropriate for the particular application and could integrate the control unit and the electric motors into a single integral unit that receives signals or commands from controller 305 and extends or retracts telescoping legs 140. Furthermore, rather than using electric motors, other forms of drive units, such as electronically controlled hydraulic cylinders, electronically controlled gas springs, etc., could also be used in place of electric motors 320.

Controller 325 is in communication with drive assembly 330 through a wired (as shown) or wireless (e.g., BLUETOOTH®, WIFI, cellular, etc.) connection and is configured to control drive assembly 330 to control the height of monitor mount 200. Controller 325 can also have an input interface, such as a touch screen, buttons, etc., that allows a user to adjust the height of monitor mount 200 up or down, save preset heights for monitor mount 200, etc. Based on the input received from the user, controller 325 sends a signal or command to drive assembly 330 to move monitor mount 200 upwards, downwards, or to a predetermined position. Drive assembly 330 is mounted in base 205 of monitor mount 200 and, in the example shown, includes an electric motor 335 in communication with controller 325. Based on the signals or commands received from controller 325, electric motor 335 of drive assembly 330 activates or deactivates to extend or retract and control the length of telescoping arm 215 to adjust the height of monitor mount 200 to the desired height. Although the example drive assembly 330 shown and described herein includes an electric motor, other forms of drive units, such as electronically controlled hydraulic cylinders, electronically controlled gas springs, etc., could also be used in place of electric motor 335.

In the example shown, controller 305 for desk frame 120 is communicatively coupled to controller 325 for monitor mount 200 and communicates through a wired (as shown) or wireless (e.g., BLUETOOTH®, WIFI, cellular, etc.) connection to synchronize activation of the controllers 305, 325 and drive assemblies 310, 330 so that an adjustment of the height of desk frame 120 causes a corresponding adjustment of the height or viewing height of monitor mount 200 and an adjustment of the viewing height of monitor mount 200 causes a corresponding adjustment of the height of desk 100. For example, a user could use the input interface on controller 305 to change the height of desk 100 (e.g., from a sitting height to a standing height or vice versa). Based on this input, controller 305 would send a signal or command to drive assembly 310 to activate electric motors 320 to raise or lower desk frame 120, as appropriate, and also send a signal or command to controller 325 instructing controller 325 that the height of desk 100 is being changed. In response to the signal or command received from controller 305, controller 325 would then send a signal or command to drive assembly 330 to activate electric motor 335 to change the height of monitor mount 200 a corresponding amount. Depending on the specific configuration, controller 325 could move monitor mount 200 the same amount as desk frame 120 or could move monitor mount 200 a proportional or predetermined amount based on the movement of desk frame 120 (e.g., monitor mount 200 may move 1 inch for every 2 inches moved by desk frame 120). Conversely, a user could also use the input interface on controller 325 to change the height of monitor mount 200. Based on this input, controller 325 would send a signal or command to drive assembly 330 to activate electric motor 335 to change the height of monitor mount 200 and also send a signal or command to controller 305 instructing controller 305 that the height of monitor mount 200 is being changed. In response to the signal or command received from controller 325, controller 305 would then send a signal or command to drive assembly 310 to activate electric motors 320 to raise desk frame 120 a corresponding amount. Depending on the specific configuration, controller 305 could move desk frame 120 the same amount as monitor mount 200 or could move desk frame 120 a proportional or predetermined amount based on the movement of monitor mount 200 (e.g., monitor mount 200 may move 1 inch for every 2 inches moved by desk frame 120).

Figure 1:
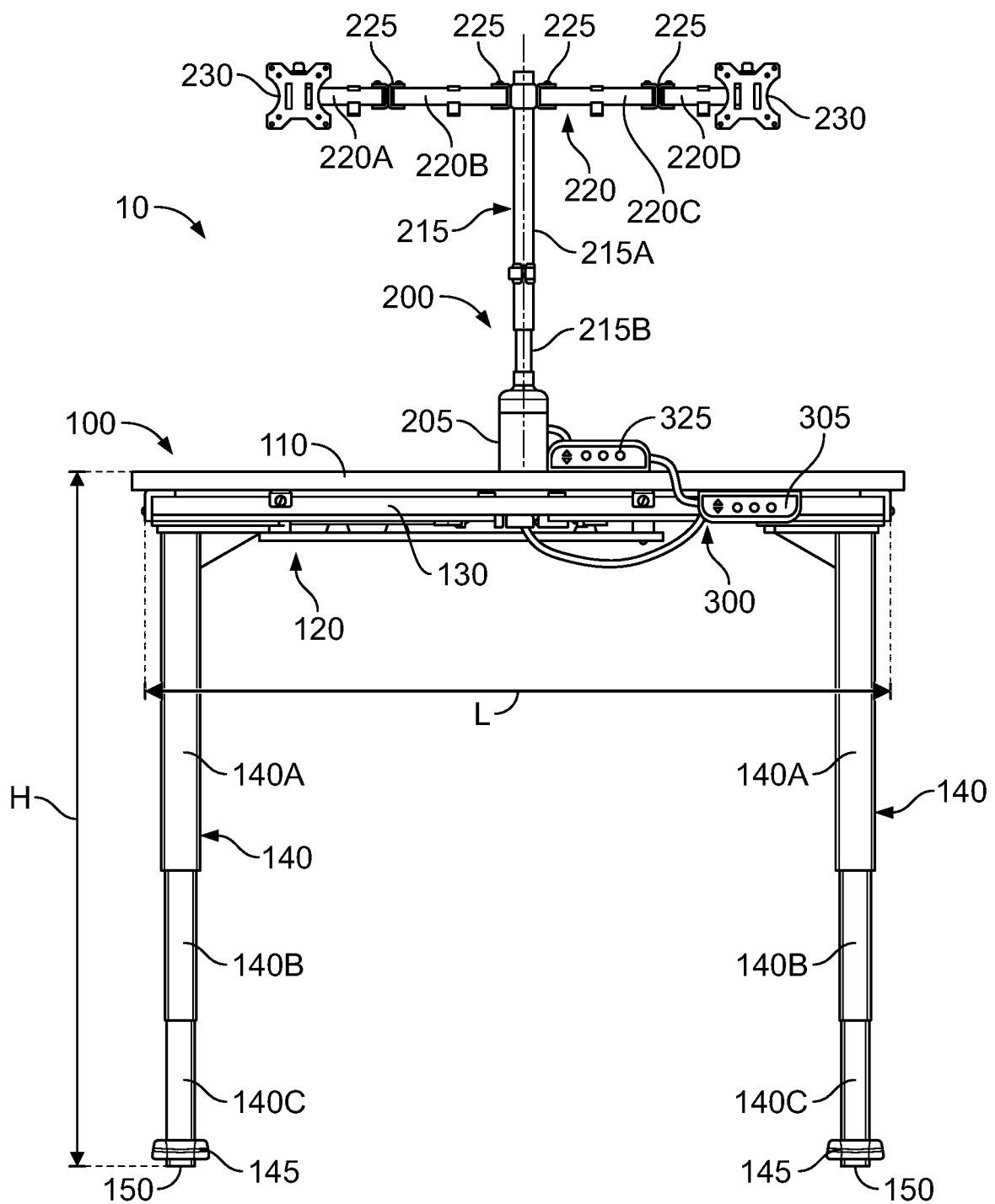
FIG. 1 is a front view of a workstation with an example height adjustment system.
Figure 2:
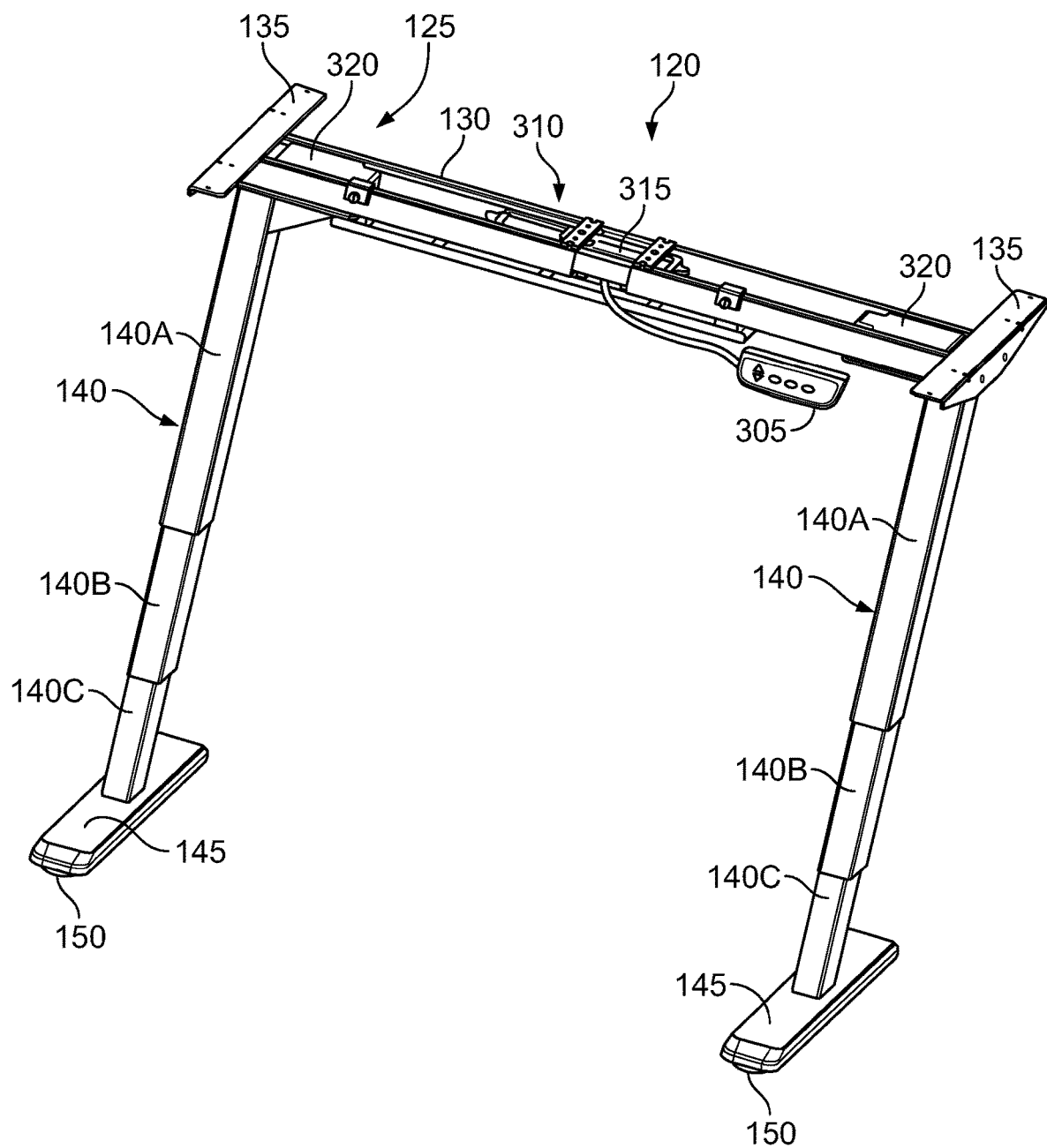
FIG. 2 is a perspective view of the desk frame of the desk of the workstation of FIG. 1.
Figure 3:
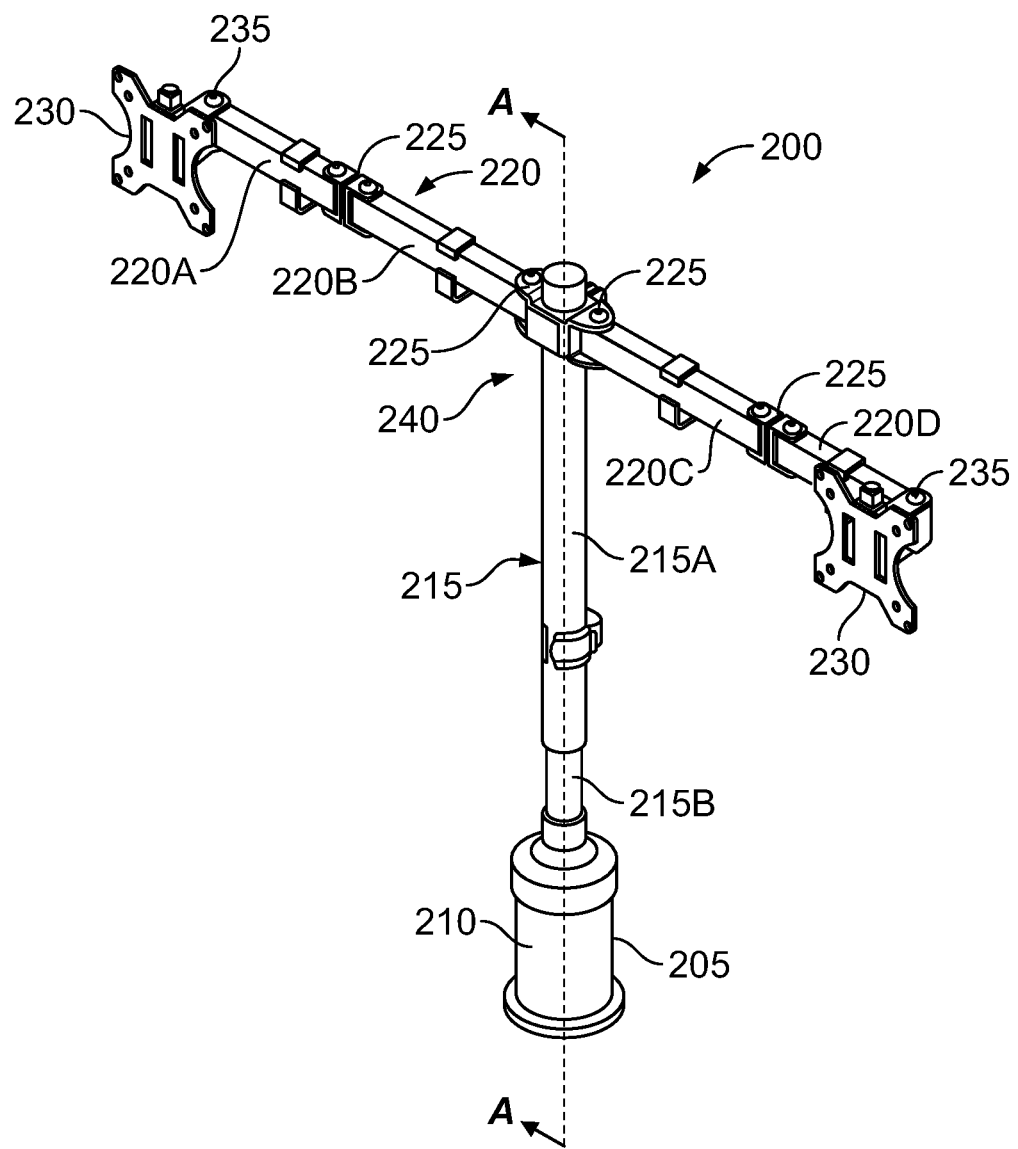
FIG. 3 is a perspective view of the monitor mount of the workstation of FIG. 1.
Figure 4:
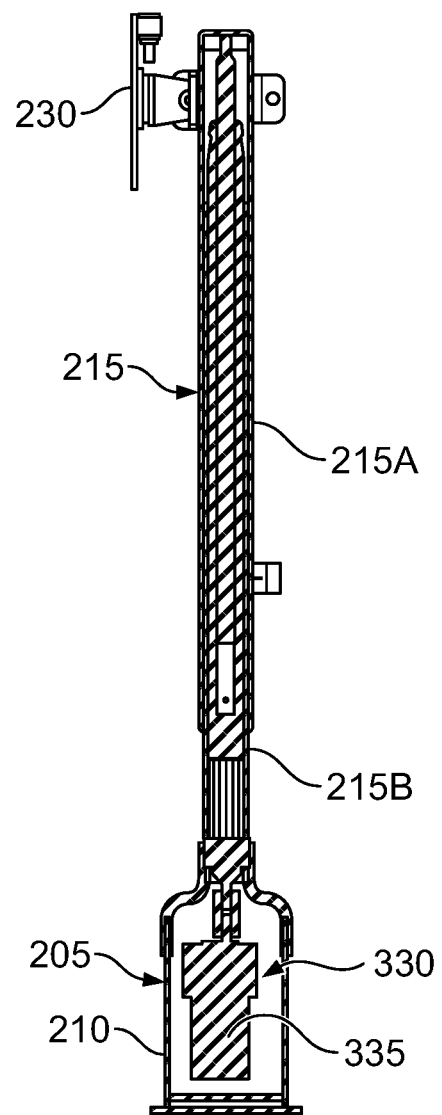
FIG. 4 is a cross-sectional view of the monitor mount of FIG. 3 taken along line A-A of FIG. 3.
Figure 5:
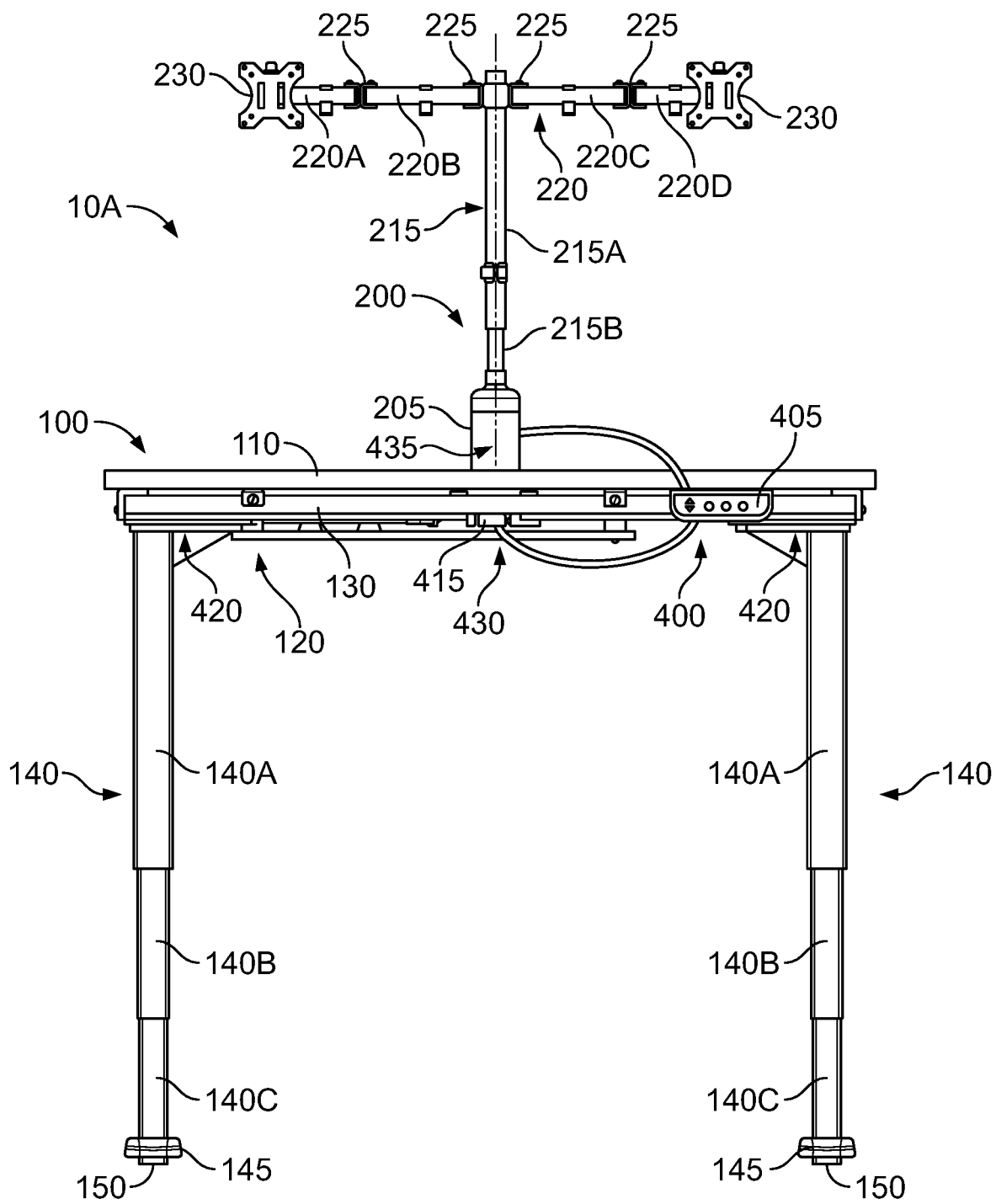
FIG. 5 is a front view of a workstation with another example height adjustment system.

FIG. 5 illustrates another example ergonomically adjustable workstation 10A, which includes the same height adjustable desk 100 and adjustable monitor mount 200 shown if FIGS. 1-4 and described above, but uses a different height adjustment system 400. Desk 100 and monitor mount 200 of workstation 10A are still individually motorized and are able to be adjusted individually or to synchronize electronically for simultaneous operation through a single controller 405 of height adjustment system 400, as described in more detail below.

To adjust the height of desk 100 and monitor mount 200, workstation 10A has a height adjustment system 400, which generally includes a controller 405, a drive assembly 410 for desk frame 120, and a drive assembly 430 for monitor mount 200.

Controller 405 is in communication with drive assembly 410 and with drive assembly 430 through wired (as shown) or wireless (e.g., BLUETOOTH®, WIFI, cellular, etc.) connections and is configured to control drive assembly 310 to control the height of desk 100 and to control drive assembly 430 to control the height of monitor mount 200. Controller 405 can have an input interface, such as a touch screen, buttons, etc., that allows a user to adjust the height of desk 100 and/or monitor mount 200 up or down, save preset heights for desk 100 and/or monitor mount 200, etc. Based on the input received from the user, controller 405 sends a signal or command (e.g., an electronic signal or command, which may be a packet-based or non-packet-based electrical signal or communication) to drive assembly 410 and/or drive assembly 430 to move desk frame 120 and/or monitor mount 200 upwards, downwards, or to a predetermined position.

Drive assembly 410 is mounted in desk frame 120 and, in the example shown, includes a control unit 415, in communication with controller 405, and a pair of electric motors 420 in communication with control unit 415 and coupled to telescoping legs 140 of desk frame 120 to control the height of desk frame 120. Based on the signals or commands received from controller 405, control unit 415 activates or deactivates electric motors 420 to extend or retract telescoping legs 140 and control the length of telescoping legs 140 to adjust the height of desk 100 to the desired height. Although the example drive assembly 410 shown and described herein includes a pair of electric motors 420 and a separate control unit 415, drive assembly 410 could use any number of electric motors appropriate for the particular application and could integrate the control unit and the electric motors into a single integral unit that receives signals or commands from controller 405 and extends or retracts telescoping legs 140. Furthermore, rather than using electric motors, other forms of drive units, such as electronically controlled hydraulic cylinders, electronically controlled gas springs, etc., could also be used in place of electric motors 320.

Drive assembly 430 is mounted in base 205 of monitor mount 200 and, in the example shown, includes an electric motor 435 in communication with controller 405. Based on the signals or commands received from controller 405, electric motor 435 of drive assembly 430 activates or deactivates to extend or retract and control the length of telescoping arm 215 to adjust the height of monitor mount 200 to the desired height. Although the example drive assembly 430 shown and described herein includes an electric motor, other forms of drive units, such as electronically controlled hydraulic cylinders, electronically controlled gas springs, etc., could also be used in place of electric motor 435.

In the example shown, in addition to controlling the height of desk frame 120 and monitor mount 200 individually, controller 405 can also be configured or programmed to synchronize activation of drive assembly 410 and drive assembly 430 so that an adjustment of the height of desk frame 120 causes a corresponding adjustment of the height or viewing height of monitor mount 200 and/or an adjustment of the viewing height of monitor mount 200 causes a corresponding adjustment of the height of desk 100. For example, a user could use the input interface on controller 405 to change the height of both desk 100 and monitor mount 200 simultaneously with a single input (e.g., from a sitting height to a standing height or vice versa). Based on this input, controller 405 would send a signal or command to both drive assembly 410 to activate electric motors 420 to raise or lower desk frame 120, as appropriate, and to drive assembly 430 to activate electric motor 435 to change the height of monitor mount 200 a corresponding amount. Depending on the specific configuration, monitor mount 200 could move the same amount as desk frame 120 or could move a proportional or predetermined amount based on the movement of desk frame 120 (e.g., monitor mount 200 may move 1 inch for every 2 inches moved by desk frame 120).

Figure 7:
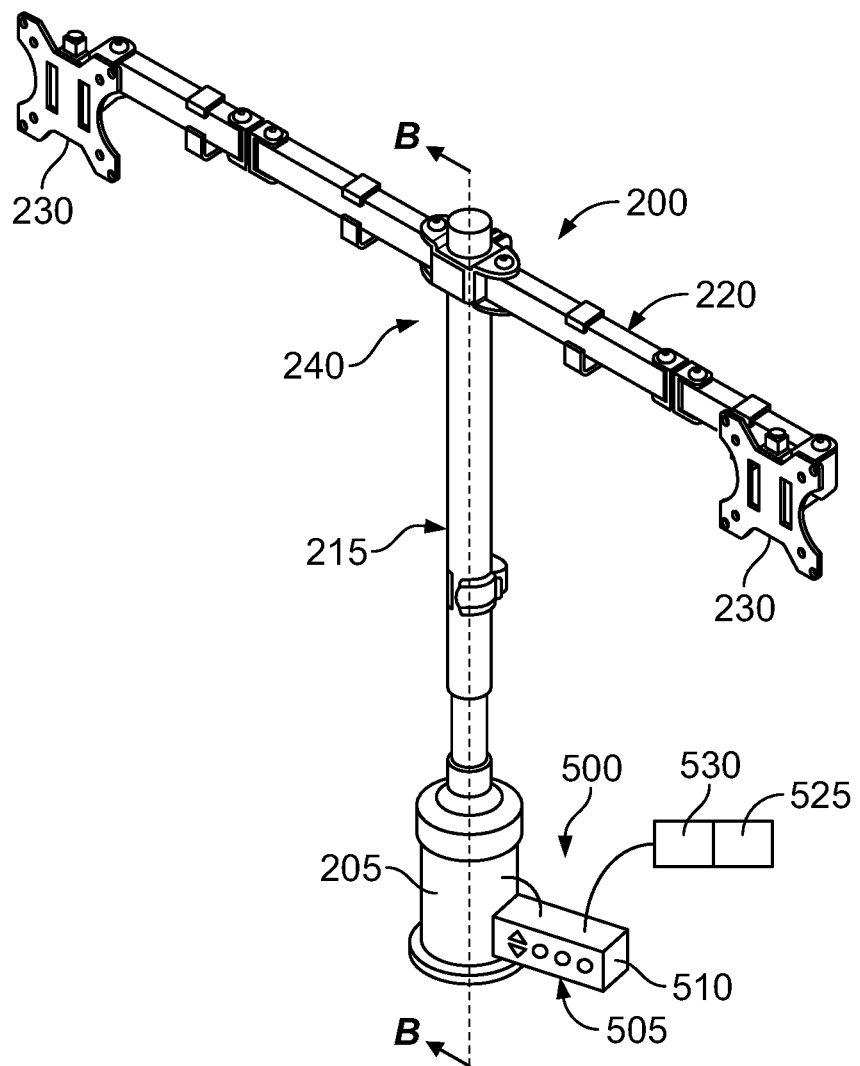
FIG. 7 is a perspective view of an example monitor mount with another example height adjustment system.
Figure 8:
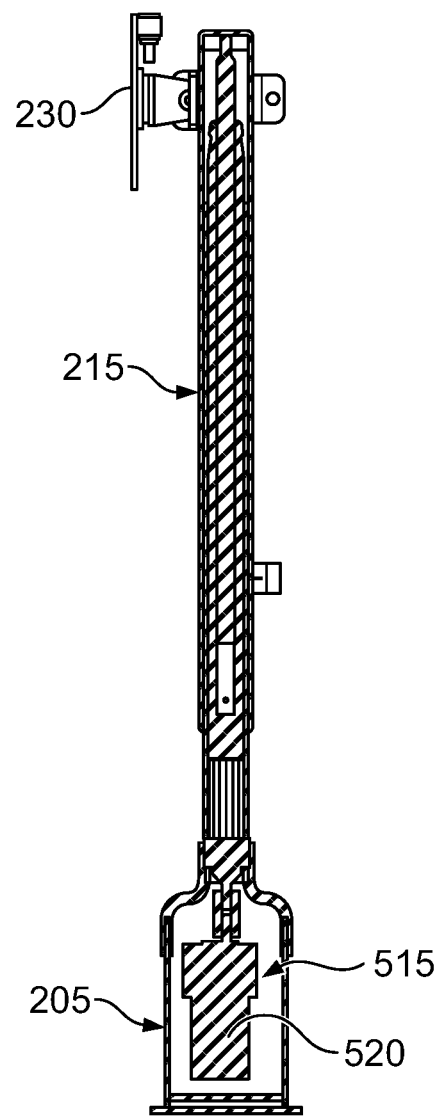
FIG. 8 is a cross-sectional view of the monitor mount of FIG. 7 taken along line B-B of FIG. 7.

FIGS. 7-8 illustrate adjustable monitor mount 200, as shown in FIGS. 3-4 and described above, with another example height adjustment system 500, which generally includes a controller 505 (monitor controller), a drive assembly 515, and a sensor 525. As discussed above, although monitor mount 200 has been described herein as being a monitor mount on which display or monitors are mounted directly, the monitor mount could also be an adjustable platform on which a standard display or monitor can be placed. In this case, the platform would be secured to the end of one or more telescoping arms, opposite the base, so that the height of the platform, and any display(s) or monitor(s) on the platform, could be adjusted.

Controller 505 is disposed within a housing 510 and is communicatively coupled to drive assembly 515 through a wired (as shown) or wireless (e.g., BLUETOOTH®, WIFI, cellular, etc.) connection to control drive assembly 515 to control the height of monitor mount 200. Although housing 510 is shown as being attached to base 205, housing 510 can also be separated from base 205 as a separate component or controller 505 can be integrated into base 205, such that housing 510 is not required. Controller 505 can also have an input interface, such as a touch screen, buttons, etc., that allows a user to adjust the height of monitor mount 200 up or down, save preset heights for monitor mount 200, etc.

Sensor 525 is also in communication with controller 505, in the example shown through transceiver 530, and is communicatively coupled to controller 505 a wired (as shown) or wireless (e.g., BLUETOOTH®, WIFI, cellular, etc.) connection. Although sensor 525 and transceiver 530 are shown as a separate unit that is in communication with controller 505 through a wired connection, sensor 525 and transceiver 530 can also be located within housing 510 or within base 205 if housing 510 is not used. In the example shown, sensor 525 could be a motion sensor (e.g., a gyroscope, an accelerometer, a proximity sensor, an optical sensor, an infrared sensor, a vibration sensor, or a light sensor), which could detect external movement of monitor mount 200, or movement of a manual, motorized, or electronic height adjustable desk or sit stand converter workstation on which monitor mount 200 is positioned. Alternatively, sensor 525 could be a position sensor (e.g., an encoder, an accelerometer, a proximity sensor, an optical sensor, or an infrared sensor), which could detect not only external movement of monitor mount 200, or movement of a manual, motorized, or electronic height adjustable desk or sit stand converter workstation on which monitor mount 200 is positioned, but also the amount of movement.

Based on a signal received from sensor 525 (e.g., such signal generated based on motion detected by sensor 525), controller 505 controls drive assembly 515 by sending a signal or command to drive assembly 515 to move monitor mount 200 upwards, downwards, or to a predetermined position to adjust the viewing height of monitor mount 200. Drive assembly 515 is disposed in base 205 of monitor mount 200, is operatively connected to frame assembly 240 to control a viewing height of monitor mount 200, and, in the example shown, includes an electric motor 520 in communication with controller 505. Based on the signals or commands received from controller 505, electric motor 520 of drive assembly 515 activates or deactivates to extend or retract and adjust the length of telescoping arm 215 to adjust the height of monitor mount 200 to the desired height. Although the example drive assembly 515 shown and described herein includes an electric motor, other forms of drive units, such as electronically controlled hydraulic cylinders, electronically controlled gas springs, etc., could also be used in place of electric motor 520.

In the example shown, controller 505 is communicatively coupled to sensor 525 to synchronize movement of monitor mount 200 with movement of a manual, motorized, or electronic height adjustable desk or sit stand converter workstation on which monitor mount 200 is positioned so that an adjustment of the height of the desk or sit stand converter workstation causes a corresponding adjustment of the height or viewing height of monitor mount 200, for example, so that the viewing height of monitor mount 200 is adjusted so that a center of a monitor attached to monitor mount 200 is at or near the eye level of the user.

Figure 9:
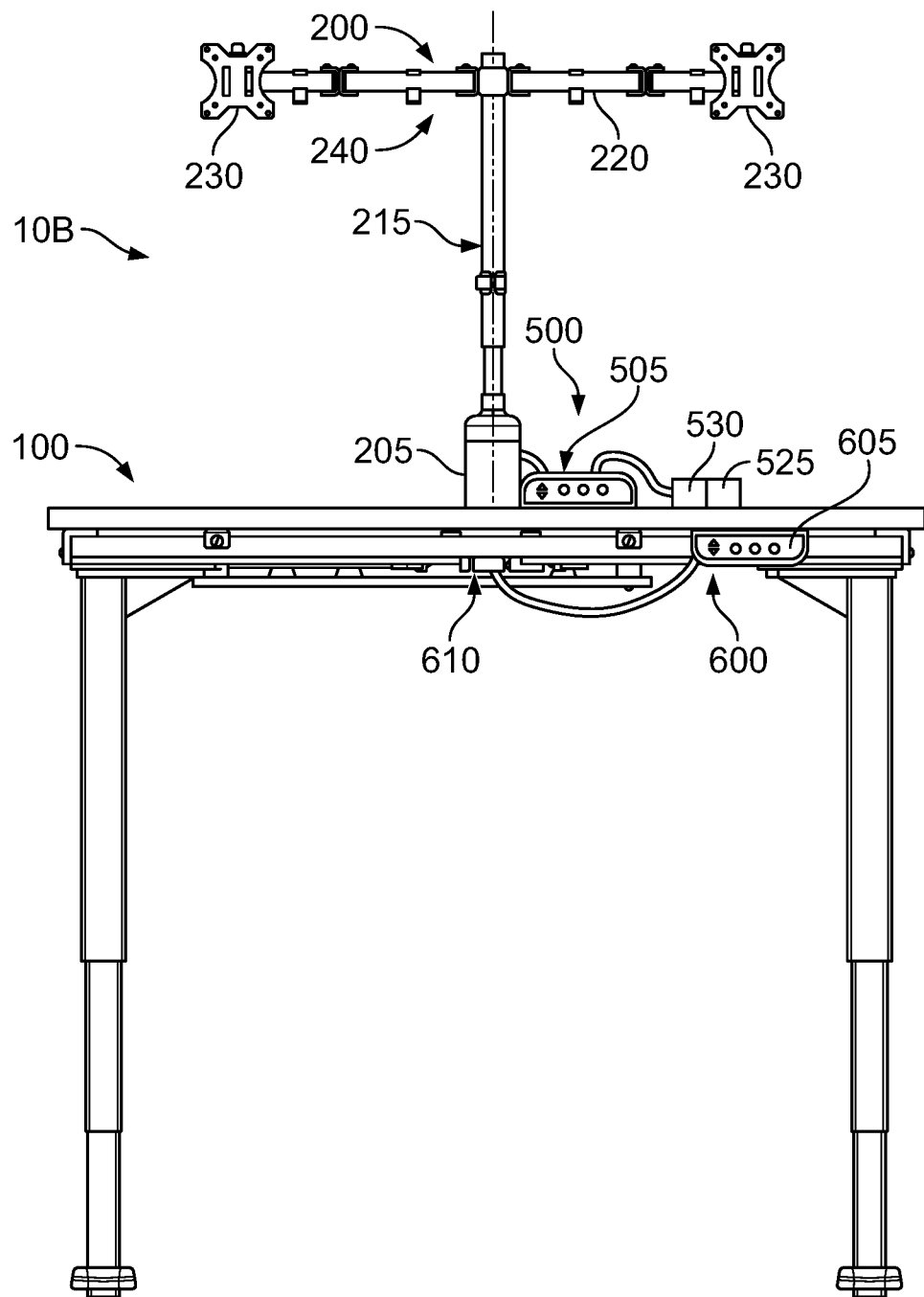
FIG. 9 is a front view of a workstation with a height adjustable desk and the example monitor mount and height adjustment system of FIG. 7.

For example, FIG. 9 illustrates a workstation 10B having monitor mount 200 with height adjustment system 500 and a motorized, electronic controlled height adjustable desk 100 having its own individual height adjustment system 600, with controller 605 (frame controller) and drive assembly 610. In this example, housing 510 of controller 505 can be mounted to an outer surface of base 205 of monitor mount 200 or can be mounted to an upper surface of a desktop of desk 100. In operating workstation 10B, a user could use an input interface on controller 605 to change the height of desk 100 (e.g., from a sitting height to a standing height or vice versa). Sensor 525 can detect the movement of desk 100 (or monitor mount 200) and, based on the detected movement, transmit a signal or communication (wired or wireless, as discussed above) to controller 505 of monitor mount 200 via transceiver 530 to indicate the movement and, preferably, the direction of the movement (e.g., upwards or downwards). Based on receipt of this signal or communication by controller 505, controller 505 would send a signal or command to drive assembly 515 to activate electric motor 520 to raise or lower monitor mount 200, as appropriate. Therefore, the viewing height of monitor mount 200 can be synchronized with the height of desk 100 to accommodate a sitting or standing position of a user without the user having to adjust both the desk 100 and the monitor mount 200 individually.

When sensor 525 is a motion sensor, the signal or communication transmitted by sensor 525 via transceiver 530 would preferably indicate that desk 100 is moving or has been moved and the direction of the sensed movement. In response to this signal or communication, controller 505 could move monitor mount 200 a predetermined amount based on a detected movement time (e.g., if desk 100 were moved for 2 seconds, drive assembly 515 can be activated in the same direction for 2 seconds) or can move monitor mount 200 to a predetermined or saved position (e.g., if desk 100 were moved upward, monitor mount 200 would be moved to the predetermined or saved standing position or, if desk 100 were moved downward, monitor mount 200 would be moved to the predetermined or saved sitting position).

When sensor 525 is a position sensor, sensor 525 can not only detect and transmit that movement has occurred and the direction of the movement, but can also detect and transmit to controller 505 the distance moved. The distance moved can be detected by the distance between sensor 525 and another object, the distance between sensor 525 and the floor, a sensed distance based on movement relative a predetermined marking(s), etc. In response to this signal or communication, controller 505 could move monitor mount 200 a predetermined distance based on the distance moved by desk 100 (e.g., monitor mount 200 may move 1 inch for every 2 inches moved by desk 100) or can move monitor mount 200 to a predetermined or saved position (e.g., if desk 100 were moved upward, monitor mount 200 would be moved to the predetermined or saved standing position or, if desk 100 were moved downward, monitor mount 200 would be moved to the predetermined or saved sitting position).

Figure 10:
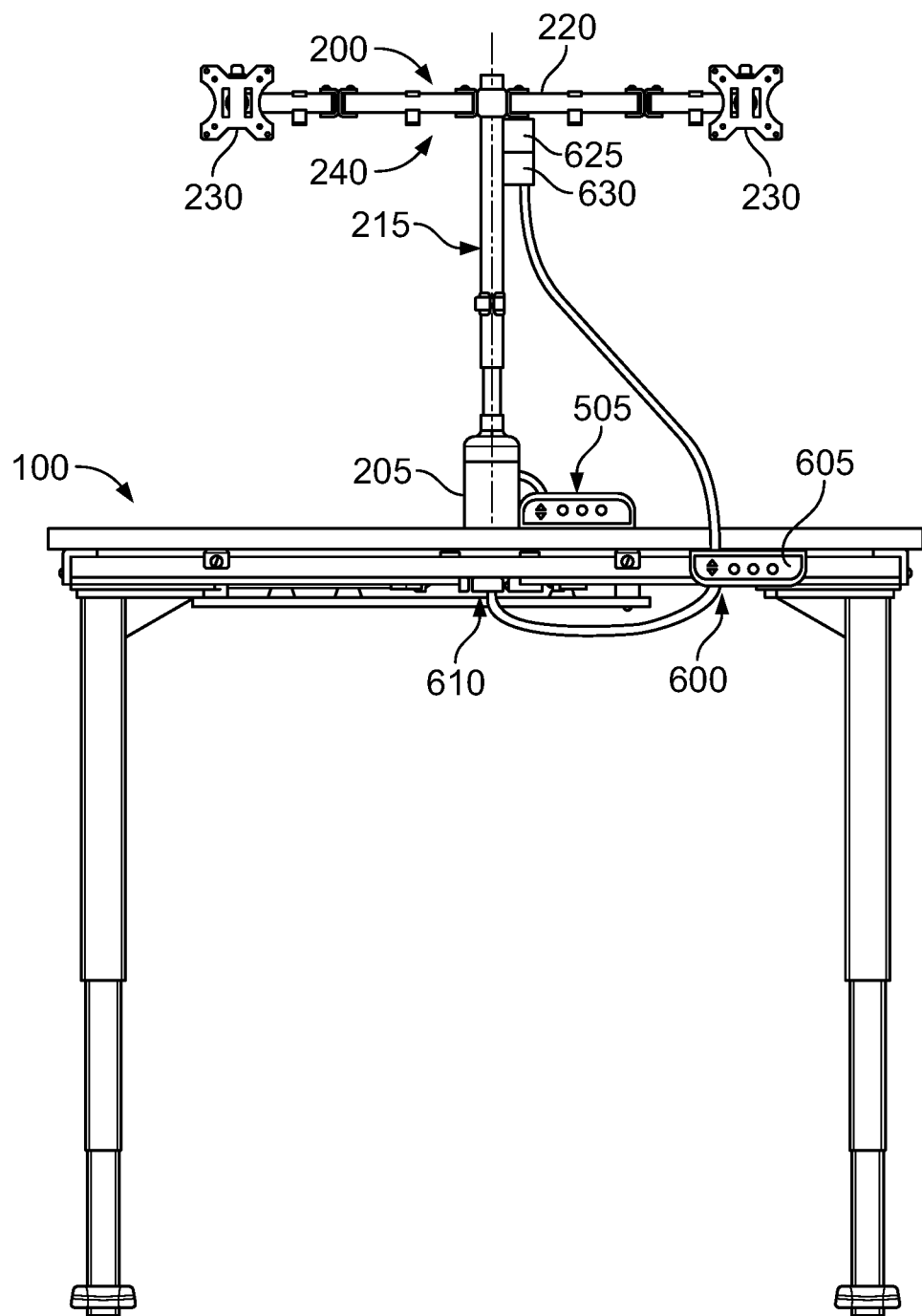
FIG. 10 is a front view of a workstation with a height adjustable desk and the monitor mount and another example height adjustment system.

Alternatively, rather than the sensor sensing movement of the desk and the monitor controller synchronizing movement of the monitor mount, as shown in FIG. 10, sensor 625 could be mounted to telescoping arm 215 or cross arm 220 of monitor mount 200 and be communicatively coupled to controller 605 of desk 100 to sense movement of monitor mount 200 and synchronize movement of desk 100 to the movement of monitor mount 200. In operation of this embodiment, a user could use an input interface on controller 505 to change the height of monitor mount 200 (e.g., from a sitting height to a standing height or vice versa). Sensor 625 can detect the movement of monitor mount 200 and, based on the detected movement, transmit a signal or communication (wired or wireless, as discussed above) to controller 605 of desk 100 via transceiver 630 to indicate the movement and, preferably, the direction of the movement (e.g., upwards or downwards). Based on receipt of this signal or communication by controller 605, controller 605 would send a signal or command to drive assembly 610 to raise or lower desk 100 (preferably so the height of the desk is adjusted such that a top of a surface of a desktop of the height adjustable desk is at or near an elbow level of a user), as appropriate. Therefore, the viewing height of monitor mount 200 can be synchronized with the height of desk 100 to accommodate a sitting or standing position of a user without the user having to adjust both the desk 100 and the monitor mount 200 individually.

When sensor 625 is a motion sensor, the signal or communication transmitted by sensor 625 via transceiver 630 would preferably indicate that monitor mount 200 is moving or has been moved and the direction of the sensed movement. In response to this signal or communication, controller 605 could move desk 100 a predetermined amount based on a detected movement time (e.g., if monitor mount 200 were moved for 2 seconds, drive assembly 610 can be activated in the same direction for 2 seconds) or can move desk 100 to a predetermined or saved position (e.g., if monitor mount 100 were moved upward, desk 100 would be moved to the predetermined or saved standing position or, if monitor mount 200 were moved downward, desk 100 would be moved to the predetermined or saved sitting position).

When sensor 625 is a position sensor, sensor 625 can not only detect and transmit that movement has occurred and the direction of the movement, but can also detect and transmit to controller 605 the distance moved. The distance moved can be detected by the distance between sensor 625 and another object, the distance between sensor 625 and the floor, a sensed distance based on movement relative a predetermined marking(s), etc. In response to this signal or communication, controller 605 could move desk 100 a predetermined distance based on the distance moved by monitor mount 200 (e.g., desk 100 may move 2 inches for every 1 inch moved by monitor mount 200) or can move desk 100 to a predetermined or saved position (e.g., if monitor mount 200 were moved upward, desk 100 would be moved to the predetermined or saved standing position or, if monitor mount 200 were moved downward, desk 100 would be moved to the predetermined or saved sitting position).

While various embodiments have been described above, this disclosure is not intended to be limited thereto. Variations can be made to the disclosed embodiments that are still within the scope of the appended claims.

The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A monitor mount, comprising:
an adjustable frame assembly; and
a height adjustment system, comprising:
a drive assembly operatively connected to the frame assembly to control a viewing height of the monitor mount;
a controller communicatively coupled to the drive assembly to control the drive assembly; and
a sensor in communication with the controller, wherein the sensor detects external movement of the monitor mount and the controller controls the drive assembly to adjust the viewing height of the monitor mount based on a signal received from the sensor.

2. The monitor mount of claim 1, wherein the controller is in communication with the sensor through one of a wired connection or a wireless connection.

3. The monitor mount of claim 1, wherein the monitor mount comprises a base and the drive assembly is disposed within the base.

4. The monitor mount of claim 1, wherein the base comprises a clamp or a grommet mount adapted to secure the monitor mount to a desk.

5. The monitor mount of claim 1, wherein the drive assembly comprises at least one of an electric motor, an electronically controlled hydraulic cylinder, or an electronically controlled gas spring.

6. The monitor mount of claim 1, wherein the frame assembly includes a telescoping arm.

7. The monitor mount of claim 6, wherein the drive assembly adjusts a length of the telescoping arm.

8. The monitor mount of claim 6, wherein the frame assembly comprises a cross arm secured to the telescoping arm and a display mounting interface secured to an end of the cross arm.

9. The monitor mount of claim 1, wherein the sensor is a motion sensor.

10. The monitor mount of claim 9, wherein the sensor is at least one of a gyroscope, an accelerometer, a proximity sensor, an optical sensor, an infrared sensor, a vibration sensor, or a light sensor.

11. The monitor mount of claim 1, wherein the sensor is a position sensor.

12. The monitor mount of claim 11, wherein the position sensor is at least one of an encoder, an accelerometer, a proximity sensor, an optical sensor, or an infrared sensor.

13. A height adjustment system, comprising:
a sensor;
a transceiver;
a controller communicatively coupled to the sensor and the transceiver, the controller configured to:
detect a first movement of an adjustable monitor mount or a height adjustable desk with the sensor; and
transmit, via the transceiver, at least one of: (1) a first communication to the adjustable monitor mount, the first communication generated based on the first movement, or (2) a second communication to the height adjustable desk, the second communication generated based on the first movement;
wherein a viewing height of the adjustable monitor mount is synchronized with a height of the height adjustable desk to accommodate a sitting position of a user or a standing position of a user.

14. The height adjustment system of claim 13, wherein the sensor is a motion sensor.

15. The monitor mount of claim 14, wherein the sensor is at least one of a gyroscope, an accelerometer, a proximity sensor, an optical sensor, an infrared sensor, a vibration sensor, or a light sensor.

16. The height adjustment system of claim 13, wherein the sensor is a position sensor.

17. The monitor mount of claim 16, wherein the position sensor is at least one of an encoder, an accelerometer, a proximity sensor, an optical sensor, or an infrared sensor.

18. The height adjustment system of claim 13, further comprising a housing, wherein:
at least one of the sensor, the transceiver, or the controller is disposed at least partially within the housing; and
the housing is mounted to either: (1) a first surface associated with the adjustable monitor mount; or (2) a second surface associated with the height adjustable desk.

19. The height adjustment system of claim 13, wherein the first communication or the second communication is a wired communication.

20. The height adjustment system of claim 13, wherein the first communication or the second communication is a wireless communication.

21. The height adjustment system of claim 13, wherein the first movement is associated with a movement of the height adjustable desk, the movement of the height adjustable desk causing transmission of the first communication to the adjustable monitor mount.

22. The height adjustment system of claim 21, wherein:
the controller is a frame controller of the height adjustable desk; and
a monitor controller of the adjustable monitor mount receives the first communication, the monitor controller adjusting the adjustable monitor mount to accommodate the sitting position or the standing position.

23. The height adjustment system of claim 13, wherein the second movement is associated with a movement of the adjustable monitor mount, the movement of the adjustable monitor mount causing transmission of the second communication to the height adjustable desk.

24. The height adjustment system of claim 23, wherein:
the controller is a monitor controller of the adjustable monitor mount; and
a frame controller of the height adjustable desk receives the second communication, the frame controller adjusting the height adjustable desk to accommodate the sitting position or the standing position.

25. The height adjustment system of claim 13, wherein the viewing height of the adjustable monitor mount is adjusted such that a center of a monitor attached to the adjustable monitor mount is at or near an eye level of a user.

26. The height adjustment system of claim 13, wherein the height of the height adjustable desk is adjusted such that a top of a surface of a desktop of the height adjustable desk is at or near an elbow level of a user.

* * * * *

UNITED STATES PATENT AND TRADEMARK OFFICE
CERTIFICATE OF CORRECTION

PATENT NO. : 11,089,865 B2  
APPLICATION NO. : 16/209046  
DATED : August 17, 2021  
INVENTOR(S) : Chance Knapp et al.

Page 1 of 1

It is certified that error appears in the above-identified patent and that said Letters Patent is hereby corrected as shown below:

In the Claims

At Column 14, Line 11, Claim 15, "monitor mount" should be -- height adjustment system --.

At Column 14, Line 17, Claim 17, "monitor mount" should be -- height adjustment system --.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*